United States Patent
Inoubli et al.

(10) Patent No.: US 10,301,464 B2
(45) Date of Patent: May 28, 2019

(54) MULTISTAGE POLYMER COMPOSITION, ITS METHOD OF PREPARATION, ITS USE AND COMPOSITION COMPRISING IT

(71) Applicant: Arkema France, Colombes (FR)

(72) Inventors: Raber Inoubli, Villeurbanne (FR); Philippe Hajji, Chatillon d'Azergues (FR)

(73) Assignee: Arkema France, Colombes (FR)

( * ) Notice: Subject to any disclaimer, the term of this patent is extended or adjusted under 35 U.S.C. 154(b) by 45 days.

(21) Appl. No.: 15/537,476

(22) PCT Filed: Dec. 23, 2015

(86) PCT No.: PCT/EP2015/081189
§ 371 (c)(1),
(2) Date: Jun. 19, 2017

(87) PCT Pub. No.: WO2016/102682
PCT Pub. Date: Jun. 30, 2016

(65) Prior Publication Data
US 2017/0369696 A1 Dec. 28, 2017

(30) Foreign Application Priority Data
Dec. 24, 2014 (FR) .................... 14 63308

(51) Int. Cl.
*C08L 63/00* (2006.01)
*C08L 51/04* (2006.01)
*C08F 265/06* (2006.01)
*C08F 285/00* (2006.01)

(52) U.S. Cl.
CPC ............ *C08L 51/04* (2013.01); *C08F 265/06* (2013.01); *C08F 285/00* (2013.01); *C08L 63/00* (2013.01); *C08L 2205/03* (2013.01); *C08L 2207/53* (2013.01)

(58) Field of Classification Search
CPC ........ C08F 265/06; C08F 285/00; C08F 2/22; C08L 63/00; C08L 51/04; C08L 51/00; C08L 2207/53; C08L 2205/03
See application file for complete search history.

(56) References Cited

U.S. PATENT DOCUMENTS

| | | |
|---|---|---|
| 4,778,851 A | 10/1988 | Henton et al. |
| 6,043,293 A | 3/2000 | Belik et al. |
| 7,485,680 B2 | 2/2009 | Furukawa et al. |
| 8,217,098 B2 | 7/2012 | Ueno et al. |
| 2007/0027233 A1 | 2/2007 | Yamaguchi et al. |
| 2010/0099800 A1 | 4/2010 | Ueno et al. |
| 2012/0142820 A1 | 6/2012 | Yamaguchi et al. |
| 2014/0350186 A1 | 11/2014 | Hatae et al. |
| 2015/0005435 A1* | 1/2015 | Park et al. ............. C08L 25/12 524/504 |
| 2016/0096955 A1 | 4/2016 | Hatae et al. |
| 2018/0002520 A1* | 1/2018 | Inoubli et al. ........ C08F 220/14 |

FOREIGN PATENT DOCUMENTS

| | | |
|---|---|---|
| EP | 2 796 482 A1 | 10/2014 |
| FR | 2 934 866 | 2/2010 |
| JP | 2012 062463 | 3/2012 |

OTHER PUBLICATIONS

Third Party Observation—AM 3366 HS-Arkema France 15817867.
3-1302/3237472—Communication Pursuant to Rule 144(2) EPC.
Resins Thermoplastic Acrylic Resin—Misubishi Rayon pp. 1-3 Jun. 9, 2018 Audiche NPL1.
Japan's Mitsubishi Solid Thermoplastic Acrylic Resin—NPL2 2 Pages Jun. 9, 2018.

* cited by examiner

*Primary Examiner* — Nathan M Nutter
(74) *Attorney, Agent, or Firm* — Lynn B. Morreale

(57) ABSTRACT

The present invention relates to a multistage polymer in form of polymeric particles, its composition and its process of preparation. The invention also relates to a multistage polymer in form of polymeric particles made by a multistage process while the last stage comprises a polymer with a low molecular weight. The invention further relates to polymer compositions in form of polymeric particles made by a multistage process comprising at least three stages while the last stage comprises a polymer with a low molecular weight, its method of preparation, its use as impact modifier in polymer compositions for composites comprising thermosetting resins or thermoplastic polymers and compositions and articles comprising it.

18 Claims, 1 Drawing Sheet

Figure 1:
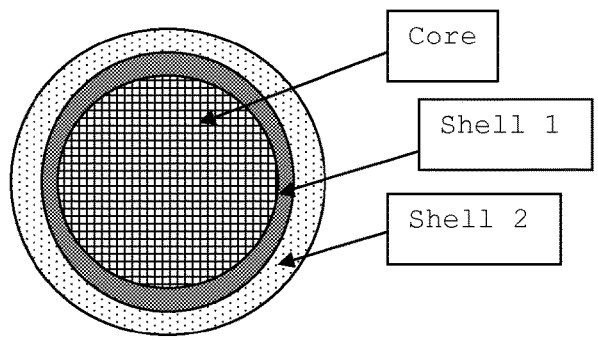

MULTISTAGE POLYMER COMPOSITION, ITS METHOD OF PREPARATION, ITS USE AND COMPOSITION COMPRISING IT

CROSS-REFERENCE TO RELATED APPLICATIONS

This application claims priority under 35 U.S.C. § 371 of PCT/EP2015/081189, filed Dec. 23, 2015 which claims benefit to application FR14.63308, filed Dec. 24, 2014.

FIELD OF THE INVENTION

The present invention relates to a multistage polymer in form of polymeric particles, its composition and its process of preparation.

In particular the present invention it relates to a multistage polymer in form of polymeric particles made by a multistage process while the last stage comprises a polymer with a low molecular weight.

More particularly the present invention relates to polymer composition in form of polymeric particles made by a multistage process comprising at least three stages while the last stage comprises a polymer with a low molecular weight, its method of preparation, its use as impact modifier in polymer compositions for composites comprising thermosetting resins or thermoplastic polymers and compositions and articles comprising it.

TECHNICAL PROBLEM

Mechanical or structured parts or articles that have to absorb high stresses during their use are widely manufactured from composite materials. A composite material is a macroscopic combination of two ore more non miscible materials. The composite material constitutes at least of a matrix material that forms a continuous phase for the cohesion of the structure and a reinforcing material with various architectures for the mechanical properties.

The aim in using composite materials is to achieve a performance from the composite material that is not available from its separate constituents if used alone. Consequently composite materials are widely used in several industrial sectors as for example building, automotive, aerospace, transport, leisure, electronics, and sport notably due to their better mechanical performance (higher tensile strength, higher tensile modulus, higher fracture toughness) in comparison with homogenous materials and their low density.

The most important class in view of volume in commercial industrial scale, are composites with organic matrices, where the matrix material is a generally a polymer. The principal matrix or continuous phase of a polymeric composite material is either a thermoplastic polymer or a thermosetting polymer.

Thermosetting polymers consist of crosslinked three dimensional structures. The crosslinking is obtained by curing reactive groups inside the so called prepolymer. Curing for example can be obtained by heating the polymer chains in order to crosslink and harden the material permanently.

In order to prepare the polymeric composite material the prepolymer is mixed with the other component such as glass beads or fibres or the other component which is wetted or impregnated and cured afterwards. Example for prepolymers or matrix material for thermoset polymers are unsatured polyesters, vinylesters, epoxy or phenolic ones.

Thermosetting resins once cured have excellent properties in view of dimensional stability, mechanical strength, electrical insulating properties, heat resistance, water resistance and chemical resistance. Such thermosetting resins are for example epoxy resins or phenolic resins. However such cured resins have small fracture toughness and are brittle.

Thermoplastic polymers consist of linear or branched polymers, which are not crosslinked. The thermoplastic polymers can be heated in order to mix the constituents necessary (for example a fibrous substrate and thermoplastic polymer for matrix) for producing the composite material and to be cooled for setting. The wetting or correct impregnation of the fibers by the thermoplastic polymer can only be achieved, if the thermoplastic resin is sufficiently fluid.

Another way for impregnating the fibrous substrate is to dissolve the thermoplastic polymer in an organic solvent or using a syrup based on monomers or a mixture or monomers and polymers.

In order to guarantee and obtain a satisfying mechanical performance over a large temperature range, the impact performance of the thermoplastic polymer matrix has to be increased.

Usually impact modifiers in form of core-shell particles are made by a multistage process, with at least stage comprising a rubber like polymer. Afterwards the particles are incorporated in the brittle polymers, in order to increase their impact resistance.

However these kind of multistage polymers are not easy to disperse in all kind of resins or polymers, especially epoxy resins.

A good homogenous dispersion is necessary for having satisfying impact performance.

The objective of the present invention is to propose a multistage polymer composition which is rapidly and easily dispersible in liquid and/or reactive epoxy resins or (meth)acrylic polymers.

An objective of the present invention is also to propose a multistage polymer composition which is easily dispersible in liquid and/or reactive epoxy resins in form of a polymer powder.

An additional objective of the present invention is to propose a multistage polymer composition in form of a dry polymer powder which is easily dispersible in liquid and/or reactive epoxy resins.

Another objective of the present invention is to propose a method for making a multistage polymer composition which is easily dispersible in liquid and/or reactive epoxy resins.

Still another objective of the present invention is a method for manufacturing a dry multistage polymer composition which is easily dispersible in liquid and/or reactive epoxy resins.

Still an additional objective is to propose an impact modified cured epoxy resin composition, with satisfying impact properties.

BACKGROUND OF THE INVENTION

Prior Art

The document EP 0 228 450 discloses rubber modified epoxy compounds. The composition comprises a continuous epoxy resin phase and a discontinuous phase of rubber particles dispersed in the continuous phase. The rubber particles are grafted rubber particles. The rubber particles are dispersed in the epoxy phase with a mixing or shearing device.

The document EP 0 911 358 discloses the use of block-copolymers as impact modifiers in epoxy resin. However block copolymers are relatively expensive and it is preferred to disperse standard core-shell impact modifiers in the epoxy resin.

The document FR 2934866 discloses polymer preparation of a specific core shell polylmers with functional shell comprising hydrophilic monomers. The core shell monomers are used as impact modifier in thermoset polymers.

The document EP 1 632 533 describes a process for producing modified epoxy resin. The epoxy resin composition is having rubber like polymer particles dispersed in it by a process that brings the particles in contact with an organic medium that disperses the rubber particles.

The document EP 1 666 519 discloses a process for producing rubbery polymer particle and process for resin composition containing the same.

The document EP 2 123 711 discloses a thermosetting resin composition having a rubbery polymer particle dispersed therein and process for production thereof.

None of the prior art documents discloses a multistage polymer comprising a stage with a polymer having a low molecular weight.

BRIEF DESCRIPTION OF THE INVENTION

Surprisingly it has been found that a polymer composition in form of polymeric particles comprising
  a) one stage (A) comprising a polymer (A1) having a glass transition temperature of less then 10° C.
  b) one stage (B) comprising a polymer (B1) having a glass transition temperature of at least 60° C. and
  c) one stage (C) comprising a polymer (C1) having a glass transition temperature of at least 30° C.
obtained by a multistage process comprising at least three stages, characterized that the polymer (C1) has a mass average molecular weight Mw of less than 100 000 g/mol can be easily dispersed in a polymeric matrix material for thermosetting polymers or thermoplastic polymers.

Surprisingly it has also been found that a method for manufacturing the polymer composition comprising the steps of
  a) polymerizing by emulsion polymerization of a monomer or monomer mixture ($A_m$) to obtain one layer in stage (A) comprising polymer (A1) having a glass transition temperature of less then 10° C.
  b) polymerizing by emulsion polymerization of a monomer or monomer mixture ($B_m$) to obtain layer in stage (B) comprising a polymer (B1) having a glass transition temperature of at least 60° C.
  c) polymerizing by emulsion polymerization of a monomer or monomer mixture (Cm) to obtain a layer in stage (C) comprising a polymer (C1) having a glass transition temperature of at least 30° C.
characterized that the polymer (C1) has a mass average molecular weight Mw of less than 100 000 g/mol yields to a polymer composition in form of polymer particles that be easily dispersed in a polymeric matrix material for thermosetting polymers or thermoplastic polymers.

Surprisingly it has also been found that a polymer composition comprising
  i) a polymer (P1) and
  ii) a polymer obtained by a multistage process with
    a) one stage (A) comprising a polymer (A1) having a glass transition temperature of less then 10° C.
    b) one stage (B) comprising a polymer (B1) having a glass transition temperature of at least 60° C. and
    c) one stage (C) comprising a polymer (C1) having a glass transition temperature of at least 30° C.
characterized that the polymer (C1) has a mass average molecular weight Mw of less than 100 000 g/mol possesses satisfying impact properties.

DETAILED DESCRIPTION OF THE INVENTION

According to a first aspect, the present invention relates to a polymer composition in form of polymeric particles comprising
  a) one stage (A) comprising a polymer (A1) having a glass transition temperature of less then 10° C.
  b) one stage (B) comprising a polymer (B1) having a glass transition temperature of at least 60° C. and
  c) one stage (C) comprising a polymer (C1) having a glass transition temperature of at least 30° C.
obtained by a multistage process comprising at least three stages, characterized that the polymer (C1) has a mass average molecular weight Mw of less than 100 000 g/mol.

According to a second aspect, the present invention relates to a method for manufacturing the polymer composition comprising the steps of
  a) polymerizing by emulsion polymerization of a monomer or monomer mixture ($A_m$) to obtain one layer in stage (A) comprising polymer (A1) having a glass transition temperature of less then 10° C.
  b) polymerizing by emulsion polymerization of a monomer or monomer mixture ($B_m$) to obtain layer in stage (B) comprising a polymer (B1) having a glass transition temperature of at least 60° C.
  c) polymerizing by emulsion polymerization of a monomer or monomer mixture (Cm) to obtain a layer in stage (C) comprising a polymer (C1) having a glass transition temperature of at least 30° C.
characterized that the polymer (C1) has a mass average molecular weight Mw of less than 100 000 g/mol.

In a third aspect the present invention relates to a method for manufacturing the polymer composition comprising the steps of
  a) polymerizing by emulsion polymerization of a monomer or monomer mixture ($A_m$) to obtain one layer in stage (A) comprising polymer (A1) having a glass transition temperature of less then 10° C.
  b) polymerizing by emulsion polymerization of a monomer or monomer mixture ($B_m$) to obtain layer in stage (B) comprising a polymer (B1) having a glass transition temperature of at least 60° C.
  c) polymerizing by emulsion polymerization of a monomer or monomer mixture (Cm) to obtain a layer in stage (C) comprising a polymer (C1) having a glass transition temperature of at least 30° C.
  d) recovering of the polymer composition
characterized that the polymer (C1) has a mass average molecular weight Mw of less than 100 000 g/mol.

In a fourth aspect the present invention relates to a a polymer composition comprising
  i) a polymer (P1) and
  ii) a polymer obtained by a multistage process with
    a) one stage (A) comprising a polymer (A1) having a glass transition temperature of less then 10° C.
    b) one stage (B) comprising a polymer (B1) having a glass transition temperature of at least 60° C. and
    c) one stage (C) comprising a polymer (C1) having a glass transition temperature of at least 30° C.

characterized that the polymer (C1) has a mass average molecular weight Mw of less than 100 000 g/mol possesses satisfying impact properties.

By the term "polymer powder" as used is denoted a polymer comprising powder grain in the range of at least 1 µm obtained by agglomeration of primary polymer comprising particles in the nanometer range.

By the term "primary particle" as used is denoted a spherical polymer comprising particle in the nanometer range. Preferably the primary particle has a weight average particle size between 50 nm and 500 nm.

By the term "particle size" as used is denoted the volume average diameter of a particle considered as spherical.

By the term "thermoplastic polymer" as used is denoted a polymer that turns to a liquid or becomes more liquid or less viscous when heated and that can take on new shapes by the application of heat and pressure.

By the term "thermosetting polymer" as used is denoted a prepolymer in a soft, solid or viscous state that changes irreversibly into an infusible, insoluble polymer network by curing.

By the term "polymer composite" as used is denoted a multicomponent material comprising multiple different phase domains in which at least one type of phase domain is a continuous phase and in which at least one component is a polymer.

By the term "copolymer" as used is denoted that the polymer consists of at least two different monomers.

By "multistage polymer" as used is denoted a polymer formed in sequential fashion by a multi-stage polymerization process. Preferred is a multi-stage emulsion polymerization process in which the first polymer is a first-stage polymer and the second polymer is a second-stage polymer, i.e., the second polymer is formed by emulsion polymerization in the presence of the first emulsion polymer, with at least two stages that are different in composition.

By the term "(meth) acrylic" as used is denoted all kind of acrylic and methacrylic monomers.

By the term "(meth) acrylic polymer" as used is denoted that the (meth)acrylic) polymer comprises essentially polymers comprising (meth)acrylic monomers that make up 50 wt % or more of the (meth)acrylic polymer.

By the term "dry" as used is denoted that the ratio of residual water is less than 1.5 wt and preferably less than 1 wt %.

With regard to the polymeric particle according to the invention, which is the primary particle, it has a weight average particle size between 15 nm and 900 nm. Preferably the weight average particle size of the polymer is between 20 nm and 800 nm, more preferably between, more preferably between 25 nm and 600 nm, still more preferably between 30 nm and 550 nm, again still more preferably between 35 nm and 500 nm, advantageously between 40 nm and 400 nm, even more advantageously between 75 nm and 350 nm and advantageously between 80 nm and 300 nm. The primary polymer particles can be agglomerated giving the polymer powder of the invention.

The multistage polymer according to the invention has at least three stages that are different in its polymer composition.

The multistage polymer is preferably in form of polymer particles considered as spherical particles. These particles are also called core shell particles. The first stage forms the core, the second or all following stages the respective shells.

The primary polymer particle according to the invention has a multilayer structure comprising at least one stage (A) comprising a polymer (A1) having a glass transition temperature below 10° C., at least one stage (B) comprising a polymer (B1) having a glass transition temperature over 60° C. and at least one stage (C) comprising a polymer (C1) having a glass transition temperature over 30° C.

Preferably the stage (A) is the first stage of the at leats three stages and the stage (B) comprising polymer (B1) is grafted on stage (A) comprising polymer (A1) or another intermediate layer.

There could also be another stage before stage (A), so that stage (A) would also be a shell.

In a first embodiment the polymer (A1) having a glass transition temperature below 10° C. comprises at least 50 wt % of polymeric units coming from alkyl acrylate and the stage (A) is the most inner layer of the polymer particle having the multilayer structure. In other words the stage (A) comprising the polymer (A1) is the core of the polymer particle, as shown schematically in FIG. 1.

With regard to the polymer (A1) of the first embodiment, it is a (meth) acrylic polymer comprising at least 50 wt % of polymeric units coming from acrylic monomers. Preferably 60 wt % and more preferably 70 wt % of the polymer (A1) are acrylic monomers.

The acrylic momonomer in polymer (A1) comprises monomers chosen from C1 to C12 alkyl acrylates or mixtures thereof. Still more preferably acrylic monomer in polymer (A1) comprises monomers of C2 to C8 alkyl acrylic monomers or mixtures thereof.

The polymer (A1) can comprise a comonomer or comonomers which are copolymerizable with the acrylic monomer, as long as polymer (A1) is having a glass transition temperature of less then 10° C.

The comonomer or comonomers in polymer (A1) are preferably chosen from (meth)acrylic monomers and/or vinyl monomers.

Most preferably the acrylic or methacrylic comonomers of the polymer (A1) are chosen from methyl acrylate, propyl acrylate, isopropyl acrylate, butyl acrylate, tert-butyl acrylate, methyl methacrylate, ethyl methacrylate, butyl methacrylate and mixtures thereof, as long as polymer (A1) is having a glass transition temperature of less then 10° C.

In a specific embodiment polymer (A1) is a homopolymer of butyl acrylate.

More preferably the glass transition temperature Tg of the polymer (A1) comprising at least 70 wt % of polymeric units coming from C2 to C8 alkyl acrylate is between −100° C. and 10° C., even more preferably between −80° C. and 0° C. and advantageously between −80° C. and −20° C. and more advantageously between −70° C. and −20° C.

In a second embodiment the polymer (A1) having a glass transition temperature below 10° C. comprises at least 50 wt % of polymeric units coming from isoprene or butadiene and the stage (A) is the most inner layer of the polymer particle having the multilayer structure. In other words the stage (A) comprising the polymer (A1) is the core of the polymer particle.

By way of example, the polymer (A1) of the core of the second embodiment, mention may be made of isoprene homopolymers or butadiene homopolymers, isoprene-butadiene copolymers, copolymers of isoprene with at most 98 wt % of a vinyl monomer and copolymers of butadiene with at most 98 wt % of a vinyl monomer. The vinyl monomer may be styrene, an alkylstyrene, acrylonitrile, an alkyl (meth)acrylate, or butadiene or isoprene. In a preferred embodiment the core is a butadiene homopolymer.

More preferably the glass transition temperature Tg of the polymer (A1) comprising at least 50 wt % of polymeric units coming from isoprene or butadiene is between −100° C. and 10° C., even more preferably between −90° C. and 0° C., advantageously between −80° C. and 0° C. and most advantageously between −70° C. and −20° C.

In a third embodiment the polymer (A1) is a silicone rubber based polymer. The silicone rubber for example is polydimethyl siloxane. More preferably the glass transition temperature Tg of the polymer (A1) of the second embodiment is between −150° C. and 0° C., even more preferably between −145° C. and −5° C., advantageously between −140° C. and −15° C. and more advantageously between −135° C. and −25° C.

With regard to the polymer (B1), mention may be made of homopolymers and copolymers comprising monomers with double bonds and/or vinyl monomers. Preferably the polymer (B1) is a (meth) acrylic polymer.

Preferably the polymer (B1) comprises at least 70 wt % monomers chosen from C1 to C12 alkyl (meth)acrylates. Still more preferably the polymer (B1) comprises at least 80 wt % of monomers C1 to C4alkyl methacrylate and/or C1 to C8 alkyl acrylate monomers.

Most preferably the acrylic or methacrylic monomers of the polymer (B1) are chosen from methyl acrylate, ethyl acrylate, methyl methacrylate, ethyl methacrylate, butyl methacrylate and mixtures thereof, as long as polymer (B1) is having a glass transition temperature of at least 60° C.

Advantageously the polymer (B1) comprises at least 70 wt % of monomer units coming from methyl methacrylate.

Preferably the glass transition temperature Tg of the polymer (B1) is between 60° C. and 150° C. The glass transition temperature of the polymer (B1) is more preferably between 80° C. and 150° C., advantageously between 90° C. and 150° C. and more advantageously between 100° C. and 150° C.

Preferably the polymer (B1) is grafted on the polymer made in the previous stage.

In certain embodiments the polymer (B1) is crosslinkend. In one embodiment the polymer (B1) comprises a functional comonomer. The functional copolymer is chosen from acrylic or methacrylic acid, the amides derived from this acids, such as for example dimethylacrylamide, 2-methoxyethyl acrylate or
methacrylate, 2-aminoethyl acrylate or methacrylate which are optionally quaternized, polyethylene glycol (meth) acrylates, water soluble vinyl monomers such as N-vinyl pyrrolidone or mixtures thereof. Preferably the polyethylene glycol group of polyethylene glycol (meth) acrylates has a molecular weight ranging from 400 g/mol to 10 000 g/mol.

With regard to the polymer (C1), it has a mass average molecular weight Mw of less than 100 000 g/mol, preferably less than 90 000 g/mol, more preferably less than 80 000 g/mol, still more preferably less than 70 000 g/mol, advantageously less than 60 000 g/mol, more advantageously less than 50 000 g/mol and still more advantageously less than 40 000 g/mol.

The polymer (C1), it has a mass average molecular weight Mw above 2 000 g/mol, preferably above 3000 g/mol, more preferably above 4000 g/mol, still more preferably above 5 000 g/mol, advantageously above 6 000 g/mol, more advantageously above 6 500 g/mol and still more advantageously above 7 000 g/mol and most advantageously above 10 000 g/mol.

The mass average molecular weight Mw of polymer (C1) is between 2 000 g/mol and 100 000 g/mol, preferable between 3 000 g/mol and 90 000 g/mol and more preferably between 4 000 g/mol and 80 000 g/mol advantageously between 5000 g/mol and 70 000 g/mol, more advantageously between 6 000 g/mol and 50 000 g/mol and most advantageously between 10 000 g/mol and 40 000 g/mol.

Preferably the polymer (C1) is a copolymer comprising (meth)acrylic monomers. More preferably the polymer (C1) is a (meth) acrylic polymer. Still more preferably the polymer (C1) comprises at least 70 wt % monomers chosen from C1 to C12 alkyl (meth)acrylates. Advantageously preferably the polymer (B1) comprises at least 80 wt % of monomers C1 to C4 alkyl methacrylate and/or C1 to C8 alkyl acrylate monomers.

Preferably the glass transition temperature Tg of the polymer (C1) is between 30° C. and 150° C. The glass transition temperature of the polymer (C1) is more preferably between 40° C. and 150° C., advantageously between 45° C. and 150° C. and more advantageously between 50° C. and 150° C.

Preferably the polymer (C1) is not crosslinked.

Preferably the polymer (C1) is not grafted on any of the polymers (A1) or (B1).

In one embodiment the polymer (C1) comprises also a functional comonomer.

The functional comonomer has the formula (1)

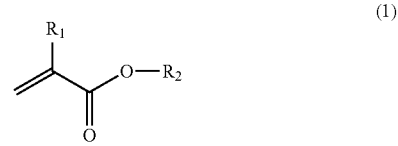

wherin $R_1$ is chosen from H or $CH_3$ and $R_2$ is H or an aliphatic oraromatic radical having at least one atom that is not C or H.

Preferably the functional monomer is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, polyethylene glycol (meth) acrylates. Preferably the polyethylene glycol group of polyethylene glycol (meth) acrylates has a molecular weight ranging from 400 g/mol to 10 000 g/mol.

In a first preferred embodiment the polymer (C1) comprises from 80 wt % to 100 wt % methyl methacrylate, preferably from 80 wt % to 99.8 wt % methyl methacrylate and from 0.2 wt % to 20 wt % of an C1 to C8 alkyl acrylate monomer. Advantageously the C1 to C8 alkyl acrylate monomer is chosen from methyl acrylate or butyl acrylate.

In a second preferred embodiment the polymer (C1) comprises between 0 wt % and 50 wt % of a functional monomer. Preferably the meth)acrylic polymer (P1) comprises between 0 wt % and 30 wt % of the functional monomer, more preferably between 1 wt % and 30 wt %, still more preferably between 2 wt % and 30 wt %, advantageously between 3 wt % and 30 wt %, more advantageously between 5 wt % and 30 and most advantageously between 5 wt % and 30 wt %.

Preferably the functional monomer of the second preferred embodiment is a (meth)acrylic monomer. The functional monomer has the formula (2) or (3)

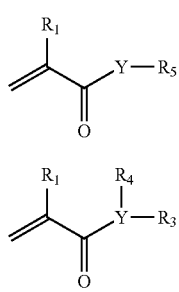

wherein in both formulas (2) and (3) $R_1$ is chosen from H or $CH_3$; and in formula (2) Y is O, $R_5$ is H or an aliphatic or aromatic radical having at least one atom that is not C or H; and in formula (3) Y is N and $R_4$ and/or $R_3$ is H or an aliphatic or aromatic radical.

Preferably the functional monomer (2) or (3) is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, acrylate or methacrylate monomers comprising a phosphonate or phosphate group, alkyl imidazolidinone (meth) acrylates, polyethylene glycol (meth) acrylates. Preferably the polyethylene glycol group of polyethylene glycol (meth) acrylates has a molecular weight ranging from 400 g/mol to 10 000 g/mol The primary polymer particle according to the invention is obtained by a multistage process comprising at least three stages.

Preferably the polymer (A1) having a glass transition temperature below 10° C. made during the stage (A), is made befor stage (B) or is the first stage of the multistage process.

Preferably the polymer (B1) having a glass transition temperature over 60° C. made during the stage (B) is made after the stage (A) of the multistage process.

Preferably the polymer (C1) having a glass transition temperature over 30° C. made during the stage (C) is made after the stage (B) of the multistage process.

More preferably the polymer (C1) having a glass transition temperature over 30° C. made during the stage (C) is the external layer of the polymer particle having the multilayer structure.

There could be additional intermediate stages, either between stage (A) and stage (B) and/or between stage (B) and stage (C).

The weight ratio r of the polymer (C1) of the external layer comprised in stage (C) in relation to the complete polymer particle is at least 5 wt %, more preferably at least 7 wt % and still more preferably at least 10 wt %.

According to the invention the ratio r of the external stage (C) comprising polymer (C1) in relation to the complete polymer particle is at most 30 w %.

Preferably the ratio of polymer (C1) in view of the primary polymer particle is between 5 wt % and 30 wt % and preferably between 5 wt % and 20 wt %.

The glass transition temperature Tg of the respective polymers can be estimated for example by dynamic methods as thermo mechanical analysis.

In order to obtain a sample of the respective polymers (A1) and (B1) they can be prepared alone, and not by a multistage process, for estimating and measuring more easily the glass transition temperature Tg individually of the respective polymers of the respective stages. The polymer (C1) can be extracted for estimating and measuring the glass transition temperature Tg.

Preferably the polymer composition of the invention comprises no solvents. By no solvents is meant that eventually present solvent make up less than 1 wt % of the composition. The monomers of the synthesis of the respective polymers are not considered as solvents. The residual monomers in the composition present less than 2 wt % of the composition.

Preferably the polymer composition according to the invention is dry. By dry is meant that the polymer composition according to the present invention comprises less than 3 wt % humidity and preferably less than 1.5 wt % humidity and more preferably less than 1.2 wt % humidity.

The humidity can be measured by a thermo balance that heats the polymer composition and measures the weight loss.

The composition according to the invention comprising the does not comprise any voluntary added solvent. Eventually residual monomer from the polymerization of the respective monomers and water are not considered as solvents.

With regard to the method for manufacturing the polymer composition according to the invention it comprises the steps of
  a) polymerizing by emulsion polymerization of a monomer or monomer mixture ($A_m$) to obtain one layer in stage (A) comprising polymer (A1) having a glass transition temperature of less then 10° C.
  b) polymerizing by emulsion polymerization of a monomer or monomer mixture ($B_m$) to obtain layer in stage (B) comprising a polymer (B1) having a glass transition temperature of at least 60° C.
  c) polymerizing by emulsion polymerization of a monomer or monomer mixture (Cm) to obtain a layer in stage (C) comprising a polymer (C1) having a glass transition temperature of at least 30° C.

characterized that the polymer (C1) has a mass average molecular weight Mw of less than 100 000 g/mol.

Preferably the step a) is made before step b).

More preferably step b) is performed in presence of the polymer (A1) obtained in step a).

Advantageously the method for for manufacturing the polymer composition according to the invention is a multi-step process comprises the steps one after the other of
  a) polymerizing by emulsion polymerization of a monomer or monomer mixture ($A_m$) to obtain one layer in stage (A) comprising polymer (A1) having a glass transition temperature of less then 10° C.
  b) polymerizing by emulsion polymerization of a monomer or monomer mixture ($B_m$) to obtain layer in stage (B) comprising a polymer (B1) having a glass transition temperature of at least 60° C.
  c) polymerizing by emulsion polymerization of a monomer or monomer mixture (Cm) to obtain a layer in stage (C) comprising a polymer (C1) having a glass transition temperature of at least 30° C.

characterized that the polymer (C1) has a mass average molecular weight Mw of less than 100 000 g/mol.

The respective monomers or monomer mixtures ($A_m$), ($B_m$) and ($C_m$) for forming the layers (A), (B) and (C) respectively comprising the polymers (A1), (B1) and (C1) respectively, are the same as defined before. The characteristics of the polymers (A1), (B1) and (C1) respectively, are the same as defined before.

Preferably the method for manufacturing the polymer composition according to the invention comprises the additional step d) of recovering of the polymer composition.

By recovering is meant partial or separation between the aqueous and solid phase, latter comprises the polymer composition.

More preferably according to the invention the recovering of the polymer composition is made by coagulation or by spray-drying.

Spray drying is the preferred method for the recovering and/or drying for the manufacturing method for a polymer powder composition according to the present invention if the polymer (A1) having a glass transition temperature below 10° C. comprises at least 50 wt % of polymeric units coming from alkyl acrylate and the stage (A) is the most inner layer of the polymer particle having the multilayer structure.

Coagulation is the preferred method for the recovering and/or drying for the manufacturing method for a polymer powder composition according to the present invention if the polymer (A1) having a glass transition temperature below 10° C. comprises at least 50 wt % of polymeric units coming from isoprene or butadiene and the stage (A) is the most inner layer of the polymer particle having the multilayer structure.

The method for manufacturing the polymer composition according to the invention can comprise optionally the additional step e) of drying of the polymer composition.

Preferably the drying step e) is made if the step d) of recovering of the polymer composition is made by coagulation.

Preferably after the drying step an e) the polymer composition comprises less than 3 wt %, more preferably less than 1.5 wt % advantageously less than 1 % of humidity or water.

The humidity of a polymer composition can be measure with a thermo balance.

The drying of the polymer can be made in an oven or vacuum oven with heating of the composition for 48 hours at 50° C.

The composition according to the invention can also be in form of larger polymer particles: a polymer powder. The polymer powder particle comprises agglomerated primary polymer particles made by the multistage process.

With regard to the polymer powder of the invention, it has a volume median particle size D50 between 1 μm and 500 μm. Preferably the volume median particle size of the polymer powder is between 10 μm and 400 μm, more preferably between 15 μm and 350 μm and advantageously between 20 μm and 300 μm.

The D10 of the particle size distribution in volume is at least 7 μm and preferably 10 μm.

The D90 of the particle size distribution in volume is at most 500 μm and preferably 400 μm, more preferably at most 250 μm.

The present invention relates also to the use of the polymer composition in form of the polymer powder according to the invention as an impact modifier in polymers, in order to obtain an impact modified polymer composition. Preferably the polymers are thermosetting polymers or its precursors.

With reagard to the impact modified polymer composition according to the invention it comprises
i) an polymer (P1) and
ii) a polymer obtained by a multistage process with
    a) one stage (A) comprising a polymer (A1) having a glass transition temperature of less then 10° C.
    b) one stage (B) comprising a polymer (B1) having a glass transition temperature of at least 60° C. and
    c) one stage (C) comprising a polymer (C1) having a glass transition temperature of at least 30° C.
characterized that the polymer (C1) has a mass average molecular weight Mw of less than 100 000 g/mol possesses satisfying impact properties.

The preferred and advantageously variants of the method for manufacturing the polymer composition obtained by the multistage process are the same as defined before.

The respective stages (A), (B) and (C) comprising the polymers (A1), (B1) and (C1) respectively, are the same as defined before.

The impact modified polymer composition according to the invention comprises between 1 wt % and 50 wt % of polymer obtained by the multistage process.

The polymer (P1) can be a thermoset polymer or its precursor, or a thermoplastic polymer.

With regard to the thermoset polymers mention may be made, by way of examples, of unsaturated polyesters resins, polyacrylics, polyurethanes, cyanoacrylates, bismaleimides and epoxy resins crosslinked by a hardener.

In a specific first embodiment of the impact modified polymer composition, the polymer (P1) is an epoxy resin having a glass transition temperature above 120° C. and the polymer (B1) comprises the before defined functional comonomers.

With regard to the thermoplastic polymers mention may be made by way of example of (meth)acrylic polymers or polycarbonates or polyesters.

With regard to the epoxy resin polymer, mention may be made of: resorcinol diglycidyl ether, bisphenol A diglycidyl ether, triglycidyl-p-amino-phenol, bromobisphenol F diglycidyl ether, the triglycidyl ether of m-amino-phenol, tetraglycidylmethylenedianiline, the triglycidyl ether of (trihydroxy-phenyl)methane, polyglycidyl ethers of phenol-formaldehyde novolak, poly-glycidyl ethers of ortho-cresol novolak and tetraglycidyl ethers of tetraphenyl-ethane. Mixtures of at least two of these resins can also be used.

The epoxy resin composition according to the invention it comprises between 1 wt % and 50 wt %, preferably between 2 wt % and 30 wt % and more preferably between 5 and 20% of polymer obtained by the multistage process.

[Methods of Evaluation]

Glass transition Temperature

The glass transitions (Tg) of the polymers are measured with equipment able to realize a thermo mechanical analysis. A RDAII "RHEOMETRICS DYNAMIC ANALYSER" proposed by the Rheometrics Company has been used. The thermo mechanical analysis measures precisely the viscoelastics changes of a sample in function of the temperature, the strain or the deformation applied. The apparatus records continuously, the sample deformation, keeping the stain fixed, during a controlled program of temperature variation. The results are obtained by drawing, in function of the temperature, the elastic modulus (G'), the loss modulus and the tan delta. The Tg is higher temperature value read in the tan delta curve, when the derived of tan delta is equal to zero.

Molecular Weight

The mass average molecular weight (Mw) of the polymers is measured with by size exclusion chromatography (SEC).

Particle Size Analysis

The particle size of the primary particles after the multistage polymerization is measured with a Zetasizer. The particle size of the polymer powder after recovering is measured with Malvern Mastersizer 3000 from MALVERN.

For the estimation of weight average powder particle size, particle size distribution and ratio of fine particles a Malvern Mastersizer 3000 apparatus with a 300mm lenses, measuring a range from 0,5-880 µm is used.

EXAMPLES

Example 1

Synthesis of Multistage Polymer Particles

First Stage A—Polymerization of a Polymer Type A1: To a 20 litres high-pressure reactor was charged: de-ionized water 116.5 parts, emulsifier potassium salt of beef tallow fatty acid 0.1 part, 1,3-butadiene 21.9 parts, t-dodecyl mercaptan 0.1 parts, and p-menthane hydroperoxide 0.1 parts as an initial kettle charge. The solution was heated, with agitation, to 43° C. at which time a redox-based catalyst solution was charged (water 4.5 parts, sodium tetrapyrophosphate 0.3 parts, ferrous sulphate 0.004 parts and dextrose 0.3 parts), effectively initiating the polymerization. Then the solution was further heated to 56° C. and held at this temperature for a period of three hours. Three hours after polymerization initiation, a second monomer charge (77.8 parts BD, t-dodecyl mercaptan 0.2 parts), one-half of an additional emulsifier and reductant charge (de-ionized water 30.4parts, emulsifier potassium salt of beef tallow fatty acid 2.8parts, dextrose 0.5 parts) and additional initiator (p-menthane hydroperoxide 0.8 parts) were continuously added over eight hours. Following the completion of the second monomer addition, the remaining emulsifier and reductant charge plus initiator was continuously added over an additional five hours. Thirteen hours after polymerization initiation, the solution was heated to 68° C. and allowed to react until at least twenty hours had elapsed since polymerization initiation, producing polybutadiene rubber latex, R1. The resultant polybutadiene rubber latex (A1) contained 38% solids and had a weight average particle size of about 160 nm.

Second Stage B—Polymerization of Polymer Type B1: into a 3.9 litres reactor was charged 75.0 parts, on a solids basis, of polybutadiene rubber latex R1, 37.6 parts de-ionized water, and 0.1 parts sodium formaldehyde sulfoxylate. The solution was agitated, purged with nitrogen, and heated to 77° C. When the solution reached 77° C., a mixture of 22.6 parts methyl methacrylate, 1.4 parts divinyl benzene and 0.1 parts t-butyl hydroperoxide initiator was continuously added over 70 minutes, followed by o hold period of 80 minutes. Thirty minutes after the onset of the hold period, 0.1 parts of sodium formaldehyde sulfoxylate and 0.1 parts t-butyl hydroperoxide were added to the reactor at once. Following the 80-minute hold period, a stabilization emulsion was added to the graft copolymer latex. The stabilization emulsion was prepared by mixing 3.2 parts de-ionized water (based on graft copolymer mass), 0.1 parts oleic acid, 0.1parts potassium hydroxyde, and 0.9 parts octadecyl-3-(3, 5-di-tertbutyl-4-hydroxyphenyl)propionate. The resultant core shell polymer (A+B) had a weight average particle size of about 180 nm.

Third Stage C—Polymerization of Polymer Type C1Synthesis of the polymer C1: semi continuous process: charged into a reactor, with stirring, were 10 000 g of core shell polymer (A+B) in de-ionized water, 0.01 g of FeSO4 and 0.032 g of ethylenediaminetetraacetic acid, sodium salt (dissolved in 10 g of de-ionized water), 3.15 g of sodium formaldehydesulfoxylate dissolved in 110 g of de-ionized water and 21.33 g of emulsifier potassium salt of beef tallow fatty acid (dissolved in 139.44 g of water), and the mixture was stirred until complete dissolution of added raw materials except core-shell polymer. Three vacuum-nitrogen purges were carried out in succession and the reactor left under a slight vacuum. The reactor was then heated. At the same time, a mixture comprising 960.03 g of methyl methacrylate, 106.67 g of dimethylacrylamide and 10.67 g of n-octyl mercaptan was nitrogen-degassed for 30 minutes. The reactor is heated at 63° C. and maintained at that temperature. Next, the monomers mixture was introduced into the reactor in 180 min using a pump. In parallel, a solution of 5.33 g of ter-butyl hydroperoxide (dissolved in 100 g of de-ionized water) is introduced (same addition time). The lines was rinsed with 50 g and 20 g of water. Then the reaction mixture was heated at a temperature of 80° C. and the polymerization was then left to completion for 60 minutes after the end of the monomers addition. The reactor was cooled down to 30° C. The mass average molecular weight of the copolymer C1 is $M_w$=28 000 g/mol.

The final polymer composition was then recovered, the polymer composition being dried by spray drying.

BRIEF DESCRIPTION OF THE DRAWING FIGURES

FIG. 1: schematic structure of the primary polymer particle according to one embodiment of the invention comprising a core, and two shells. The core made in stage (A) comprises polymer (A1), the shell (1) made in stage (B) comprises polymer (B1) and shell (2) made in stage (C) comprises polymer (C1).

Figure 2:
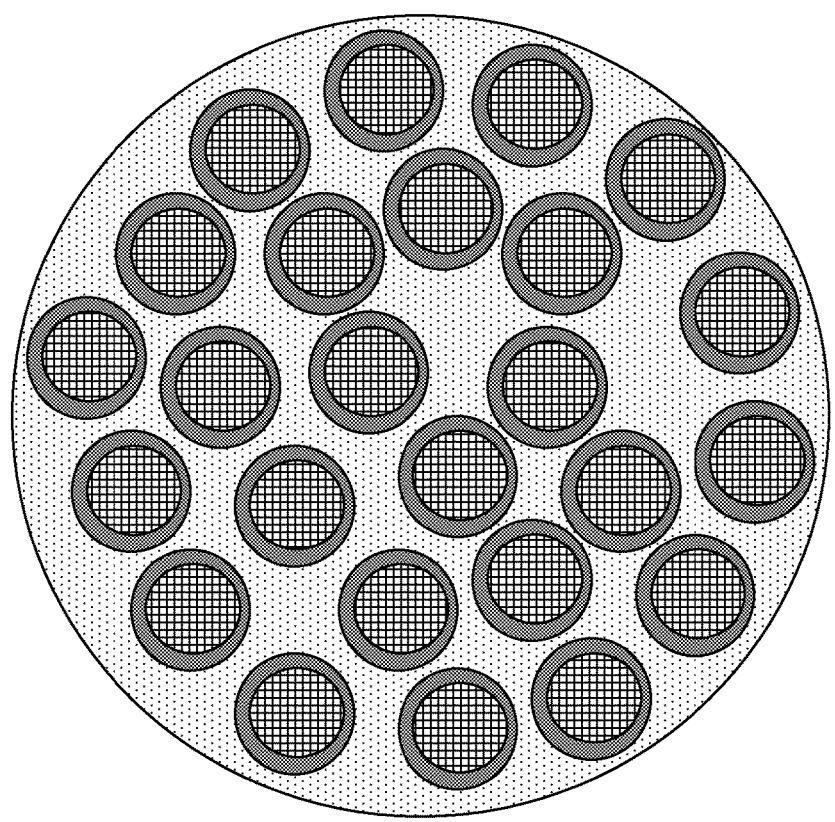

FIG. 2: schematic structure of the polymer composition in form of a polymer powder consisting of agglomerated primary polymer particles after spray drying.

The invention claimed is:
1. A polymer composition in the form of polymeric particles comprising
    a) one stage (A) comprising a polymer (A1) having a glass transition temperature of less than 10° C.,
    b), one stage (B) comprising a polymer (B1) having a glass transition temperature of at least 60° C., and
    c) one stage (C) comprising a polymer (C1) having a glass transition temperature of at least 30° C.,
obtained by a multistage process comprising at least three stages, wherein polymer (C1) has a mass average molecular weight Mw of less than 100 000g/mol.

2. The polymer composition according to claim 1, wherein stage (A) is the first stage and wherein stage (B) comprising polymer (B1) is grafted on stage (A) comprising polymer (A1).

3. The polymer composition according to claim 1 wherein stage (C) comprising polymer (C1) is not grafted on any of the polymers (A1) or (B1).

4. The polymer composition according to claim 1 wherein polymer (C1) comprises a functional comonomer or wherein polymers (B1) and (C1) comprise a functional comonomer.

5. The polymer composition according to claim 2 wherein the functional monomer is chosen from the group consisting of glycidyl (meth)acrylate, acrylic and methacrylic acid, the amides derived from acrylic and methacrylic acids, dimethylacrylamide, 2-methoxyethyl acrylate, 2-methoxyethyl methacrylate, 2-aminoethyl acrylates optionally quaternized, 2-aminoethyl methacrylates optionally quaternized, and polyethylene glycol (meth) acrylates.

6. The polymer composition according to claim 1 wherein polymer (B1) is crosslinked.

7. The polymer composition according to claim 1 wherein polymers (B1) and (C1) are acrylic or methacrylic polymers.

8. The polymer composition according to claim 1 wherein polymer (A1) comprises butadiene as monomer.

9. The polymer composition according to claim 1 wherein polymers (A1), (B1) and (C1) are Acrylic or methacrylic polymers.

10. The polymer composition according to claim 7 wherein at least 80 wt % the acrylic or methacrylic momonomers of the polymers (A1), (B1) or (C1) are chosen from the group consisting of methyl acrylate, propyl acrylate, isopropyl acrylate, butyl acrylate, tert-butyl acrylate, methyl methacrylate, ethyl methacrylate, butyl methacrylate and mixtures thereof.

11. A method for manufacturing the polymer composition comprising the steps of:
  a) polymerizing by emulsion polymerization of a monomer or monomer mixture ($A^m$) to obtain one layer in stage (A) comprising polymer (A1) having a glass transition temperature of less than 10° C.,
  b) polymerizing by emulsion polymerization of a monomer or monomer mixture ($B_m$) to obtain layer in stage (B) comprising a polymer (B1) having a glass transition temperature of at least 60° C.,
  c) polymerizing by emulsion polymerization of a monomer or monomer mixture (Cm) to obtain a layer in. stage (C) comprising a polymer (C1) having a glass transition temperature of at least 30° C.,
wherein polymer (C1) has a mass average molecular weight Mw of less than 100000g/mol.

12. The method according to claim 11, wherein step a) is made before step b).

13. The method according to claim 11 wherein step b) is performed in presence of the polymer (A1) obtained in step a).

14. The method according to claim 11 wherein steps a), b) and c) are performed in that order.

15. The method according to according to claim 11 comprising an additional step d) recovering of the polymer composition.

16. The method according to claim 11 wherein step d) is made by coagulation or by spray-drying.

17. A polymer composition comprising
  i) a polymer (P1) and
  ii) a multistage polymer obtained by a multistage process with
    a) one stage (A) comprising a polymer (A1) having a glass transition temperature of less than 10° C.,
    b), one stage (B) comprising a polymer (B1) having a glass transition temperature of at least 60° C., and
    c) one stage (C) comprising a polymer (C1) having a glass transition temperature of at least 30° C.,
wherein polymer (C1) has a mass average molecular weight Mw of less than 100 000g/mol.

18. The polymer composition according to claim 17 wherein polymer (P1) is thermoset polymer or its precursor, or a thermoplastic polymer.

* * * * *